(12) United States Patent
Otto et al.

(10) Patent No.: US 12,151,418 B2
(45) Date of Patent: Nov. 26, 2024

(54) HYDRAULIC DRIVE APPARATUS FOR A SHAPING MACHINE

(71) Applicant: ENGEL AUSTRIA GmbH, Schwertberg (AT)

(72) Inventors: Markus Otto, Ernsthofen (AT); Anton Lohnecker, Ertl (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 220 days.

(21) Appl. No.: 17/705,955

(22) Filed: Mar. 28, 2022

(65) Prior Publication Data
US 2022/0305712 A1    Sep. 29, 2022

(30) Foreign Application Priority Data

Mar. 29, 2021  (AT) .............................. A 50223/2021

(51) Int. Cl.
*B29C 45/82* (2006.01)
*B29C 45/53* (2006.01)
*B29C 45/77* (2006.01)

(52) U.S. Cl.
CPC ............ *B29C 45/82* (2013.01); *B29C 45/531* (2013.01); *B29C 45/77* (2013.01); *B29C 2945/76006* (2013.01); *B29C 2945/76214* (2013.01); *B29C 2945/76692* (2013.01); *B29C 2945/76929* (2013.01)

(58) Field of Classification Search
CPC .. F15B 2211/20576; F15B 2211/20584; F15B 2211/20592
See application file for complete search history.

(56) References Cited

U.S. PATENT DOCUMENTS 3,940,930 A  *  3/1976  Rosander ............ B29C 45/6707
                                                       100/269.09
4,907,960 A  *  3/1990  Hertzer ................. B29C 45/561
                                                             425/593

(Continued)

FOREIGN PATENT DOCUMENTS

DE          37 11 053         10/1988
DE          199 24 473        11/2000
(Continued)

*Primary Examiner* — Thomas E Lazo
(74) *Attorney, Agent, or Firm* — Wenderoth, Lind & Ponack, L.L.P.

(57) ABSTRACT

A hydraulic drive apparatus includes a first hydraulic pump, a drive motor connected to the first hydraulic pump, a hydraulic line system connecting the first hydraulic pump to the consumer, and a closed-loop control unit. The closed-loop control unit has a first switching element to change a displacement volume of the first hydraulic pump between a predetermined minimum value and a maximum value. A second hydraulic pump is connected to the drive motor, and the hydraulic line system connects the second hydraulic pump to a consumer and has a first branch line connected to the first hydraulic pump, a second branch line connected to a second hydraulic pump, and a main line. The two branch lines open into the main line, and the closed-loop control unit has a second switching element for changing a displacement volume of the second hydraulic pump between a predetermined minimum value and a maximum value.

18 Claims, 6 Drawing Sheets

(56) References Cited

U.S. PATENT DOCUMENTS

| | | |
|---|---|---|
| 5,148,676 A | 9/1992 | Moriya et al. |
| 5,634,334 A * | 6/1997 | Hehl .................. B29C 45/82 |
| | | 91/363 R |
| 6,557,344 B1 | 5/2003 | PUschel |
| 6,772,589 B2 | 8/2004 | Schienbein et al. |
| 2003/0037545 A1 | 2/2003 | Schienbein et al. |
| 2021/0317848 A1* | 10/2021 | Consonni ............. E02F 9/2292 |

FOREIGN PATENT DOCUMENTS

| | | | |
|---|---|---|---|
| DE | 10 2007 007 005 | 8/2008 | |
| DE | 102007007005 A1 * | 8/2008 | ............ B29C 45/82 |
| EP | 0 402 474 | 12/1990 | |

* cited by examiner

HYDRAULIC DRIVE APPARATUS FOR A SHAPING MACHINE

BACKGROUND OF THE INVENTION

The present invention concerns a hydraulic drive apparatus for a shaping machine, in particular for an injection molding machine, comprising a first hydraulic pump, a drive motor connected to the first hydraulic pump by way of a drive shaft, at least one consumer, a hydraulic line system connecting the first hydraulic pump to the consumer, and a closed-loop control unit for closed-loop control of the hydraulic drive apparatus. The closed-loop control unit has a first switching element by which a displacement volume of the first hydraulic pump can be changed over between a predetermined minimum value and a maximum value depending on a predetermined pressure threshold and/or a predetermined volume flow threshold. The invention further concerns a shaping machine comprising such a hydraulic drive apparatus.

Hydraulic drive apparatuses are used for various purposes in shaping machines. For example, a closing unit, an ejector or parts of an injection assembly can be driven by way of such hydraulic drive apparatuses. Generally, consumers in the form of piston-cylinder units are used.

An example of an electrohydraulic control arrangement for the actuation of a hydraulic consumer is disclosed in DE 10 2007 007 005 A1. Specifically this involves a main closed-loop control circuit and a secondary adjustment chain. That secondary adjustment chain can include a two-point controller, by which the displacement volume of the adjustable fluid pump can be switched over between a predetermined minimum value and a maximum value depending on a predetermined pressure threshold.

Such systems, per se, are certainly suitable to be used for consumers in injection molding machines. A problem, however, can be that, depending on the respective size of the consumers, suitable hydraulic pumps and drive motors also have to be provided. The maximum load to be operated with the consumer must therefore also be managable by the drive motor and the hydraulic pump. The larger they are to be, the higher the manufacturing costs will be. In addition, it must be possible to implement relatively high torque levels and also a relatively high pressure has to be built up. That results in a cost-intensive structure which is also susceptible to wear.

SUMMARY OF THE INVENTION

The object of the present invention therefore is to provide a hydraulic drive apparatus which is improved over the state of the art. In particular, the invention aims to eliminate or at least alleviate the disadvantages referred to.

Accordingly, the second hydraulic pump is connected to the drive motor by the drive shaft. Accordingly, a second hydraulic pump is provided on the same drive shaft and driven by the same drive motor.

Further, the hydraulic line system connects the second hydraulic pump to the consumer and has a first branch line connected to the first hydraulic pump, and a second branch line connected to the second hydraulic pump and a main line. The two branch lines open into the main line. Accordingly, the second hydraulic pump also serves to supply the same consumer as the first hydraulic pump.

According to the invention, the closed-loop control unit has a second switching element, by way of which a displacement volume of the second hydraulic pump can be changed over between a predetermined minimum value and a maximum value depending on a predetermined pressure threshold and/or a predetermined volume flow threshold. Accordingly, both hydraulic pumps can be individually switched on-independently of each other. With a high load, both hydraulic pumps together can achieve a correspondingly higher power output for the consumer to be driven, while with a lower necessary load, only one hydraulic pump is also sufficient.

Overall, in that way it is possible to drive one (or more) relatively large consumer or consumers with relatively small drive elements (drive motor and hydraulic pumps).

The minimum value and the maximum value of the hydraulic pumps can be different—for example, depending on the respective size of the individual pump. In the case of hydraulic pumps of the same size, those values can also be different.

For even more versatile switching options and if there is the need because of the consumer, a third hydraulic pump can be provided. The third hydraulic pump is connected to the drive motor by the drive shaft, and the hydraulic line system connects the third hydraulic pump to the consumer and has a third branch line connected to the third hydraulic pump and opening into the main line. The closed-loop control unit has a third switching element, by which a displacement volume of the third hydraulic pump can be changed over between a predetermined minimum value and a maximum value depending on a predetermined pressure threshold and/or a predetermined volume flow threshold.

In order to be able to dispense with relatively complicated and expensive constant closed-loop controllers, a preferred embodiment provides that the switching elements also respectively form a two-point controller. A two-point controller is a discontinuously operating controller having two output states. Two-point controllers are used when the control value is not continuously variable but can change only between two states, for example on/off or minimum/maximum value.

Preferably, at least one of, preferably all of, the hydraulic pumps has/have a maximum delivery volume of 250 $cm^3$, preferably between 25 and 200 $cm^3$, particularly preferably between 45 and 180 $cm^3$.

It is possible that the individual hydraulic pumps have different sizes and/or are designed for different maximum delivery volumes. Thus, for example the first hydraulic pump can be a larger main pump.

For easier manufacture and more advantageous provision, however, all hydraulic pumps are of the same size or produce the same power. Accordingly, the hydraulic pumps are substantially identical.

According to a preferred embodiment, the drive motor is in the form of a servomotor, preferably with a maximum power of 300 kilowatts, particularly preferably with a power between 40 and 250 kilowatts.

The drive apparatus at issue does not form a closed system. Accordingly, the hydraulic pumps at the set minimum value are switched to tank.

It is possible that the consumer is in the form of a hydraulic rotary motor. However, it is preferable that the consumer is in the form of a hydraulic piston-cylinder unit.

Further, two or more consumers can be driven by the hydraulic line system by the drive motor with the at least two hydraulic pumps. In this case, corresponding switching elements can then be provided for switching over between consumers or for simultaneous drive.

For better handling and more versatile setting options, a directional control valve, which preferably also forms the closed-loop control unit, is arranged in the main line of the hydraulic line system.

Further preferably, the closed-loop control unit has a measuring device for measuring the hydraulic pressure and/or the volume flow in the main line. The measuring device can possibly also be adapted to measure a relative position of the piston of the piston-cylinder unit.

Protection is also sought for a shaping machine comprising a hydraulic drive apparatus according to the invention.

BRIEF DESCRIPTION OF THE DRAWINGS

Further details and advantages of the present invention will be described in more detail hereinafter by means of the specific description with reference to the embodiments by way of example illustrated in the drawings in which.

DETAILED DESCRIPTION OF THE INVENTION

Figure 1:
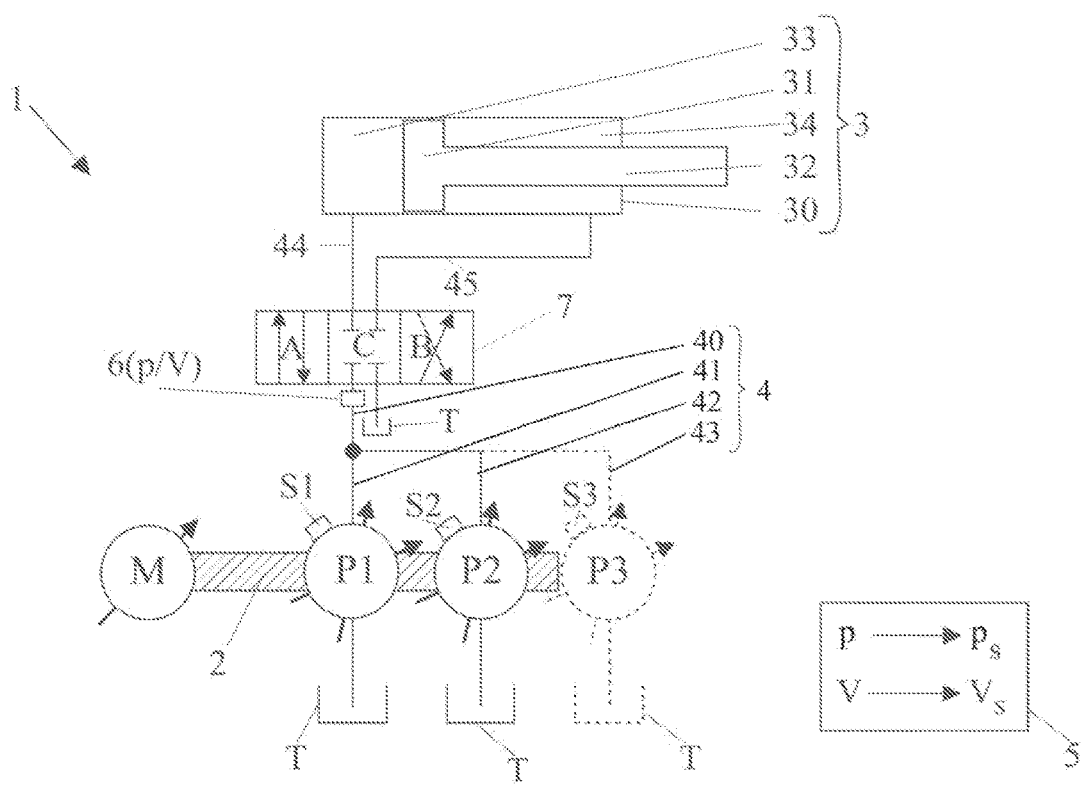
FIG. 1 diagrammatically shows a hydraulic drive apparatus with drive motor, hydraulic pumps, hydraulic line system, closed-loop control unit and consumer.

FIG. 1 diagrammatically shows a hydraulic drive apparatus 1. This hydraulic drive apparatus 1 has a drive motor M and a drive shaft 2 driven in rotation by the drive motor M.

The first hydraulic pump P1 and the second hydraulic pump P2 are driven by the drive shaft 2. A third hydraulic pump P3 (and if desired, further pumps) can possibly also be connected to the same drive shaft 2.

The hydraulic pumps P1, P2, P3 are in the form of variable displacement pumps and can be adjusted between two positions (indicated by the two arrows). In one position (corresponding to the maximum value), hydraulic fluid is conveyed into the hydraulic line system 4. In the other position (corresponding to the minimum value), no hydraulic fluid or a lower value than the maximum value is delivered (or possibly delivered back into the tank T). In other words, there are three possible options for the other (second) position: delivery amount less than maximum value, no volume flow at all is delivered or the hydraulic fluid is delivered to tank.

The hydraulic line system 4 has the first branch line 41 branching from the first hydraulic pump P1, the second branch line 42 branching from the second hydraulic pump P2 (optionally, the third branch line 43 branching from the third hydraulic pump P3) as well as the main line 40, into which the branch lines 41, 42 (and possibly 43) open.

The switching elements S1, S2 and S3 of the closed-loop control unit 5 are respectively arranged at or in the hydraulic pumps P1, P2 and P3. By way of those switching elements S1, S2 and S3 it is possible for the displacement volume V of the respectively associated hydraulic pump P1, P2 and P3 to be switched over between a predetermined minimum value and a maximum value depending on a predetermined pressure threshold $p_s$ and/or a predetermined volume flow threshold $V_s$.

A directional control valve 7 is arranged in the main line 40. In this specific case, that proportional control valve 7 is in the form of a 4/3 way directional control valve and is in a closed position C.

The consumer 3 is in the form of a piston-cylinder unit and has a cylinder 30, a piston 31 linearly moveable in the cylinder 30, the piston rod 32, the piston-side chamber 33 and the rod-side chamber 34. The piston-side line 44 of the hydraulic line system 4 leads into the piston-side chamber 33 while the rod-side line 45 leads into the rod-side chamber 34.

If the directional control valve 7 is in the first open position A (left-hand part of the symbol)—different from the way shown in FIG. 1—then hydraulic fluid is conveyed by way of the directional control valve 7 and the piston-side line 44 into the piston-side chamber 33 of the consumer 3 in the form of the piston-cylinder unit and the piston 31 moves towards the right relative to the cylinder 30.

If, in contrast, the directional control valve 7 is in the second open position B (right-hand part of the symbol), then hydraulic fluid is delivered by the directional control valve 7 and the rod-side line 45 into the rod-side chamber 34 of the consumer 3 and the piston 31 moves towards the left relative to the cylinder 30.)

A measuring device 6 is arranged in the main line 40. The hydraulic pressure p or the displacement volume V can be measured with that measuring device 6. Alternatively or in addition, a measuring device 6 can be arranged in one of the lines 44 or 45.

In FIG. 1, the closed-loop control unit 5 is diagrammatically indicated. The signal-carrying communications between the main control part of the closed-loop control unit 5 and the individual further components (for example switching elements S1, S2, S3, directional control valve 7, measuring device 6, drive motor M and so forth} are not shown.

The closed-loop control unit 5 can be connected in signal-carrying relationship with a higher-level shaping machine control system (not shown) or can be an integral component part thereof.

The closed-loop control unit 5 has access to a predetermined pressure threshold $p_s$ or to a predetermined volume flow threshold $V_s$. The hydraulic pressure p currently measured by the measuring device 6 and/or the currently measured volume flow is compared to the appropriate value. If the threshold ($p_s$ and/or $V_s$) is exceeded, then one of the hydraulic pumps P1, P2 and/or P3 is switched over. If, for example, more volume flow is required, one of the hydraulic pumps P1, P2 or P3 is switched to the maximum value. The more volume flow that is required, the more hydraulic pumps P1, P2, P3 are switched to the maximum value. If a high hydraulic pressure is required, at least one hydraulic pump P1, P2, P3 has to be switched to the minimum value. The higher the pressure required, the more hydraulic pumps P1, P2, P3 are switched to the minimum value.

Figure 2:
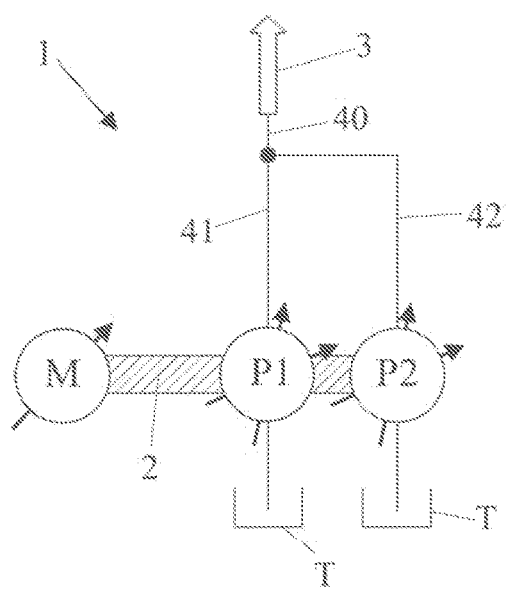
FIG. 2 is a simplified diagrammatic view of the drive apparatus.

FIG. 2 shows the hydraulic drive apparatus 1 with the same mode of operation in still more simplified form.

Figure 3:
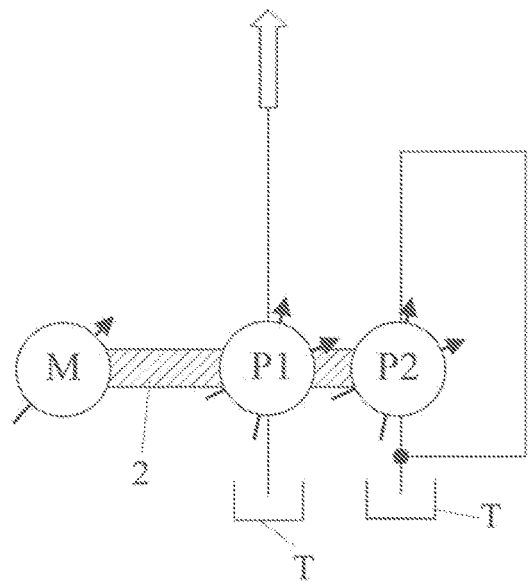
FIG. 3 is a diagrammatic view of the hydraulic drive apparatus with a hydraulic pump switched to tank.

A possible enlargement as shown in FIG. 3 provides that one (or more) hydraulic pump(s) P2 is switched to tank while the other pump P1 is in the pressure control mode. As a result, this affords less loading for the drive motor M. The amount to tank T is relatively low in that case. It is possible to operate a small volume with a low rotary speed.

It should be noted that "downsizing" of the drive motor M is possible with the invention. An oversized drive motor M is not necessary, and it suffices if a plurality of hydraulic pumps P1, P2 (P3) are connected by the drive shaft 2 to a (small) drive motor M and with the switching elements S1, S2 (S3) form a system circuit. Each hydraulic pump P1, P2 (P3) with its associated switching element S1, S2 (S3) forms a two-point controller. As both hydraulic pumps P1 and P2 drive a consumer 3, the four switching positions virtually give a four-point controller. If there is also a third hydraulic pump P3 with an associated switching element S3, the eight possible switching position combinations virtually result in an eight-point controller. Therefore, the drive can be used in a better way and adapted to the consumer 3. By way of example, therefore two (or three) smaller hydraulic pumps can be used instead of one large hydraulic pump.

These implementations are to be illustrated by way of example by reference to the following Table:

| Swash angle | | | | | Maximum |
| --- | --- | --- | --- | --- | --- |
| P1 | P2 | Movement | Pressure | Required amount | possible amount |
| 100 | 100 | Mold movement | 40 | 100 | 100 |
| 50 | 100 | Metering | 65 | 65 | 75 |
| 100 | 25 | Injection | 80 | 50 | 62.5 |
| 50 | 25 | High pressure build-up | 100 | 35 | 37.5 |

The first column of that Table shows the two possible swash angles of the first hydraulic pump P1. In specific terms, with that first hydraulic pump P1, in the first (maximum) switching position, it is possible to deliver a maximum delivery amount (displacement volume V) of 100% (maximum value 100) and in the second (minimum) switching position, it is possible to deliver a minimum delivery amount of 50% of the displacement volume (minimum value 50). The second hydraulic pump P2 (second column of the Table) is configured such that at the maximum value 100% and at the minimum value 25% can be delivered.

As is already apparent from those first two columns, this affords overall four combinations of switching positions. Each of those switching position combinations is particularly well suitable for a given movement of the consumer 3. The exact amounts required are achieved by adaptation of the rotary speed. In other words, the ranges are selected by way of the four switching positions but the exact amounts wanted are achieved by control of the rotary speed.

Thus—if both hydraulic pumps P1 and P2 are operated at the maximum value at 100% by way of their respective switching elements S1 and S2—the mold movement is effected by way of the hydraulically driven consumer 3 at a pressure by way of example of 40% of the maximum value with a delivery amount by way of example of 100% (see the third, fourth and fifth column of the Table).

If the first hydraulic pump P1 is set to the minimum value of 50% and the second hydraulic pump P2 is set to the maximum value of 100%, then metering is effected by way of the consumer 3 at a pressure of 65% and at a (required) delivery amount of 65%.

If the first hydraulic pump P1 is set to the maximum value of 100% and the second hydraulic pump P2 is set to the minimum value of 25%, then injection is effected by way of the consumer 3 at a pressure of 80% and with a delivery amount of 50%.

If the first hydraulic pump P1 is set to the minimum value of 50% and the second hydraulic pump P2 is set to the minimum value of 25%, then the high-pressure build-up is effected by way of the consumer 3 at a pressure of 100% and with a delivery amount of 35%.

This overall leads to a four-point controller.

If a third hydraulic pump P3 is also switched on, this leads to even finer divisions and overall an eight-point controller by virtue of the eight combination options of switching positions.

Figure 4:
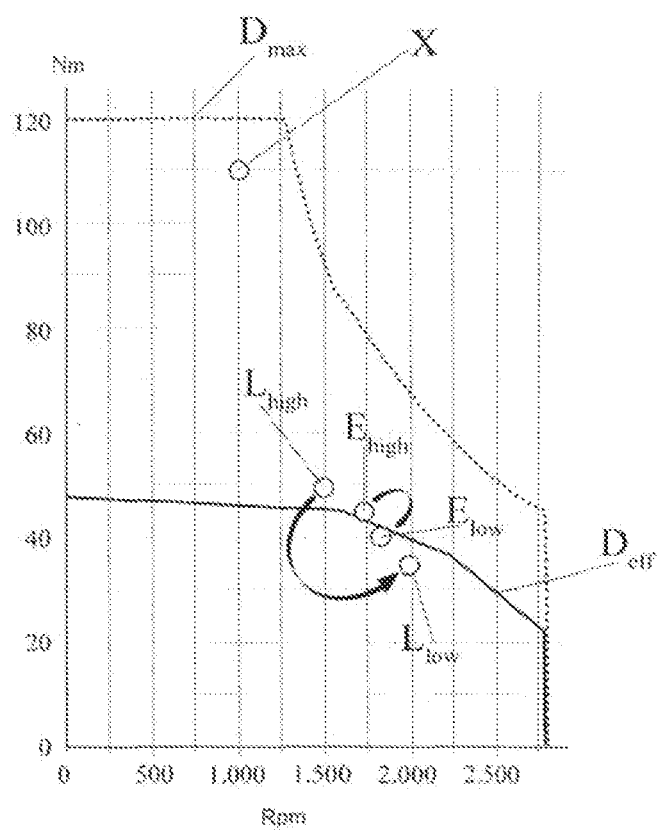
FIGS. 4-6 are graphs with the maximum torque and the effective torque.

FIG. 4 shows a graph with the maximum torque $D_{max}$ of the drive motor M and the effective torque $D_{eff}$ of the drive motor M. The torque is plotted in Newton meters (Nm) on the ordinate of the graph while the motor revolutions per minute (rpm) are plotted on the abscissa. The effective torque $D_{eff}$ can also be referred to as the continuous torque and corresponds to the total of all working points or the average power over the cycle of the drive motor M. The point X stands, for example, for an operating point for the temporarily occurring maximum load. The points $L_{high}$ and $L_{low}$ are load points. In specific terms, the load point $L_{high}$—which corresponds to a specific load point in the case of a hydraulic pump according to the state of the art—is displaced by the use of two hydraulic pumps P1 and P2 to the load point $L_{low}$ which is below the effective torque $D_{eff}$ of the drive motor M. As a result, the rotary speed (rpm) rises while the torque (Nm) decreases. In other words, one of the hydraulic pumps P1 or P2 swashes back through which the torque is reduced and the rotary speed is increased. The change also has a positive effect on the effective torque points $E_{high}$ and $E_{low}$ of the drive motor. If the effective torque point $E_{high}$ occurs (which with the load point $L_{high}$ would be the case), then the drive motor M would actually have to be increased or the cycle time prolonged so that that procedure could be afforded at all. By virtue of the present invention, it is possible to remain below the effective torque line $D_{eff}$ which is clearly illustrated by the effective torque point $E_{low}$. Accordingly, this leads to a positive effect on the implementation, the effective torque $D_{eff}$ falls.

Figure 5:
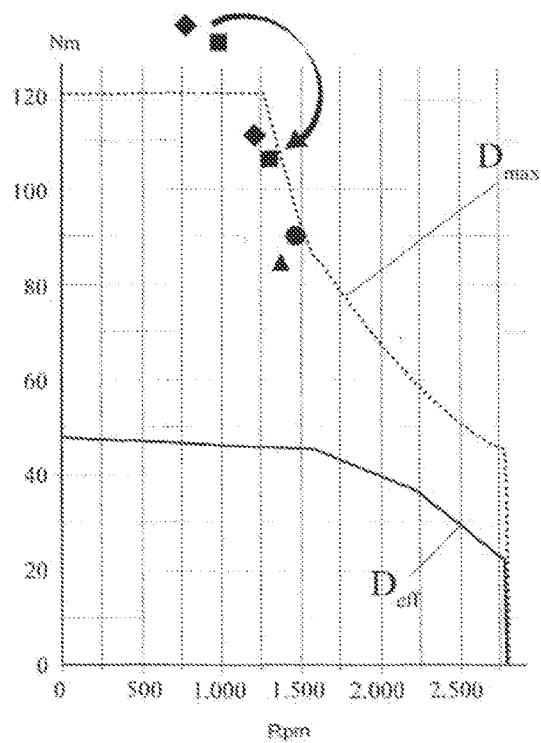
Figure 6:
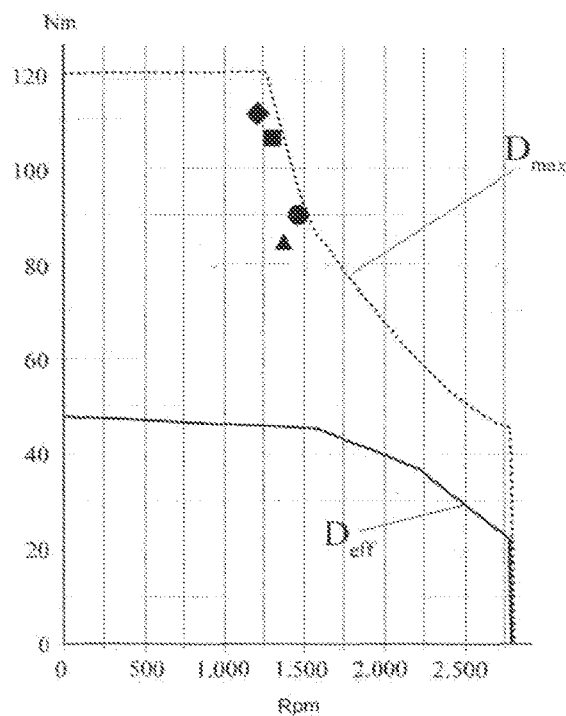

FIGS. 5 and 6 show compared graphs, once again with the maximum torque $D_{max}$ and the effective torque $D_{eff}$. In addition, working points with different geometrical shapes are plotted, corresponding to different movements of the consumer. In conformity with the Table already set forth and discussed above, the circle corresponds to the mold movement, the square corresponds to the metering, the diamond corresponds to the injection and the triangle corresponds to the high-pressure build-up. As indicated in FIG. 5, the additional switching positions in respect of movement with a large delivery amount and a mean pressure working point provides that the working points for the metering and the injection operation are below the line for the maximum torque $D_{max}$. Accordingly, the "downsizing" is illustrated here, too. It is apparent that this drive motor M could not be selected with a single two-point controller. By way of the four-point controller, the working points can be shifted into the motor characteristic.

Figure 7:
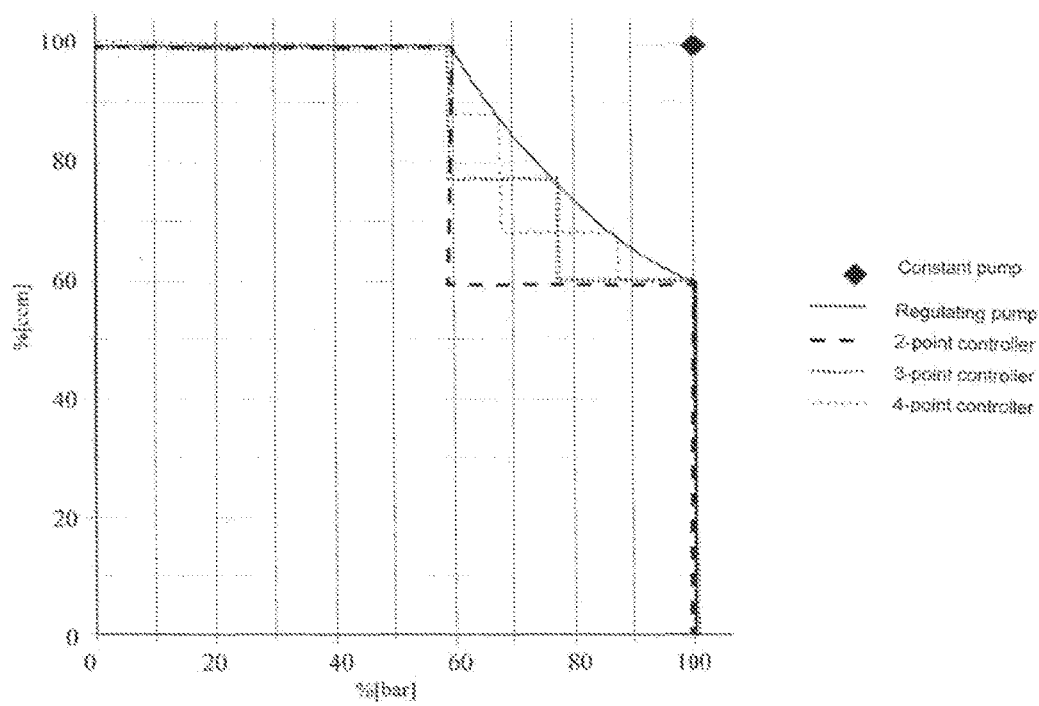
FIGS. 7 & 8 are volume-pressure graphs with various closed-loop control lines.

FIG. 7 is a graph showing a comparison of a constant pump, a regulating pump, a 2-point controller, a 3-point controller and a 4-point controller. The pressure (bar) in percent is plotted on the abscissa of the graph while the delivery amount (cm³) is plotted in percent on the ordinate. In the case of the constant pump (not according to the invention), the maximum delivery amount and the maximum pressure are always design-relevant. In the case of the regulating pump (not according to the invention), there is a relatively straight control curve, wherein such a regulating pump is relatively complicated and cost-intensive. In contrast, a plurality of switching points can be implemented with the multi-point controllers.

Figure 8:
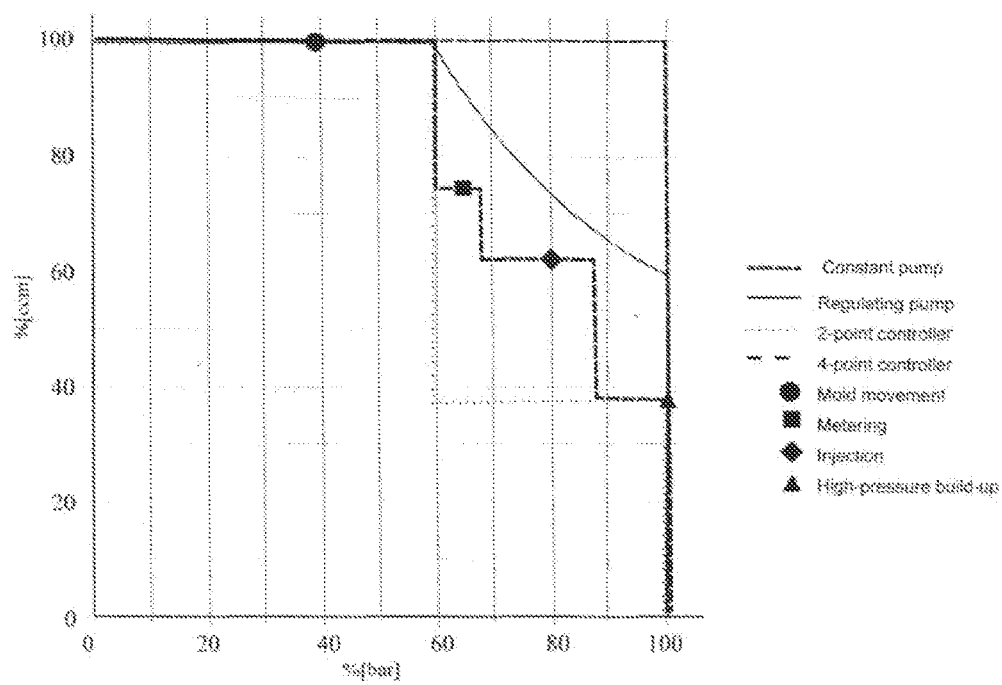

Finally, FIG. 8—similarly to FIG. 7—shows a graph in which the control lines of the two-point controller and the four-point controller are linked to the above-discussed working points or movements of the consumer 3.

LIST OF REFERENCES 1 hydraulic drive apparatus
2 drive shaft
3 consumer
cylinder
31 piston
32 piston rod
33 piston-side chamber
34 rod-side chamber
4 hydraulic line system
40 main line
41 first branch line
42 second branch line
43 third branch line
44 piston-side line
45 rod-side line
5 closed-loop control unit
6 measuring device
7 directional control valve
P1 first hydraulic pump
P2 second hydraulic pump
P3 third hydraulic pump
S1 first switching element
S2 second switching element
S3 third switching element
M drive motor
V displacement volume
$p_s$ pressure threshold
$V_s$ volume flow threshold
T tank
p hydraulic pressure
A first open position
B second open position
C closed position
$D_{max}$ maximum torque
$D_{eff}$ effective torque
X maximum operating point
$L_{high}$ load point
$L_{low}$ load point
$E_{high}$ effective torque point
$E_{low}$ effective torque point

The invention claimed is:

1. A hydraulic drive apparatus for a shaping machine, comprising:
   a first hydraulic pump,
   a drive motor connected to the first hydraulic pump by a drive shaft,
   a second hydraulic pump connected to the drive motor by the drive shaft,
   a consumer,
   a hydraulic line system connecting the first hydraulic pump and the second hydraulic pump to the consumer, the hydraulic line system including a first branch line connected to the first hydraulic pump, a second branch line connected to the second hydraulic pump, and a main line, wherein the first branch line and the second branch line both open into the main line,
   a closed-loop control unit for closed-loop control of the hydraulic drive apparatus, the closed-loop control unit including:
      a first switching element configured to change a displacement volume of the first hydraulic pump between a predetermined minimum value and a maximum value depending on a predetermined pressure threshold and/or a predetermined volume flow threshold, and
      a second switching element configured to change a displacement volume of the second hydraulic pump between a predetermined minimum value and a maximum value depending on a predetermined pressure threshold and/or a predetermined volume flow threshold.

2. The drive apparatus as set forth in claim 1, further comprising a third hydraulic pump,
   wherein the third hydraulic pump is connected to the drive motor by the drive shaft,
   wherein the hydraulic line system connects the third hydraulic pump to the consumer and has a third branch line connected to the third hydraulic pump and opening into the main line, and
   wherein the closed-loop control unit further includes a third switching element, configured to change a displacement volume of the third hydraulic pump between a predetermined minimum value and a maximum value depending on a predetermined pressure threshold and/or a predetermined volume flow threshold.

3. The drive apparatus as set forth in claim 2, wherein the closed-loop control unit is configured such that each of the first switching element, the second switching element, and the third switching element forms a two-point controller, thereby providing a total of eight different combinations of switching positions of the first switching element, the second switching element, and the third switching element.

4. The drive apparatus as set forth in claim 1, wherein the first switching element and the second switching element each form a respective two-point controller.

5. The drive apparatus as set forth in claim 1, wherein at least one of the first hydraulic pump and the second hydraulic pump has a maximum delivery volume of 250 cm$_3$.

6. The drive apparatus as set forth in claim 1, wherein the drive motor is a servomotor.

7. The drive apparatus as set forth in claim 6, wherein the servomotor has a maximum power of 300 kilowatts.

8. The drive apparatus as set forth in claim 6, wherein the servomotor has a power in a range between 40 kilowatts and 250 kilowatts.

9. The drive apparatus as set forth in claim 1, wherein at least one of the first hydraulic pump and the second hydraulic pump is switched with the set minimum value to tank.

10. The drive apparatus as set forth in claim 1, wherein the consumer is a hydraulic piston-cylinder unit.

11. The drive apparatus as set forth in claim 1, further comprising a directional control valve in the main line of the hydraulic line system.

12. The drive apparatus as set forth in claim 11, wherein the closed-loop control unit comprises the directional control valve.

13. The drive apparatus as set forth in claim 1, wherein the closed-loop control unit includes a measuring device for measuring the hydraulic pressure and/or the volume flow in the main line.

14. The drive apparatus as set forth in claim 1, wherein the closed-loop control unit is configured such that each of the first switching element and the second switching element forms a respective two-point controller, thereby providing a total of four different combinations of switching positions of the first switching element and the second switching element.

15. A shaping machine comprising the hydraulic drive apparatus as set forth in claim 1.

16. The drive apparatus as set forth in claim 1, wherein each of the first hydraulic pump and the second hydraulic pump has a maximum delivery volume of 250 cm$^3$.

17. The drive apparatus as set forth in claim 1, wherein each of the first hydraulic pump and the second hydraulic pump has a maximum delivery volume in a range of between 25 cm$^3$ and 200 cm$^3$.

18. The drive apparatus as set forth in claim 1, wherein each of the first hydraulic pump and the second hydraulic pump has a maximum delivery volume in a range of between 45 cm$^3$ and 180 cm$^3$.

* * * * *